United States Patent
Kaneda

(10) Patent No.: US 12,309,330 B2
(45) Date of Patent: May 20, 2025

(54) PRINTING APPARATUS CONFIGURED TO TRANSMIT SHEET TYPE INFORMATION, METHOD FOR CONTROLLING THE SAME, AND STORAGE MEDIUM

(71) Applicant: CANON KABUSHIKI KAISHA, Tokyo (JP)

(72) Inventor: Takeshi Kaneda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/888,323

(22) Filed: Aug. 15, 2022

(65) Prior Publication Data

US 2022/0394139 A1 Dec. 8, 2022

Related U.S. Application Data

(63) Continuation of application No. PCT/JP2021/004481, filed on Feb. 8, 2021.

(30) Foreign Application Priority Data

Feb. 19, 2020 (JP) ................................ 2020-026534

(51) Int. Cl.
   *G06F 3/12* (2006.01)
   *H04N 1/00* (2006.01)

(52) U.S. Cl.
   CPC ....... *H04N 1/0048* (2013.01); *H04N 1/00474* (2013.01)

(58) Field of Classification Search
   CPC ............. H04N 1/0048; H04N 1/00474; H04N 2201/0094; H04N 1/00244;
   (Continued)

(56) References Cited

U.S. PATENT DOCUMENTS

2006/0238789 A1* 10/2006 Pesar .................. H04N 1/0097
                                                                358/1.13
2007/0109587 A1*  5/2007 Yamakawa ........ H04N 1/32662
                                                                358/1.14

(Continued)

FOREIGN PATENT DOCUMENTS

CN       102736872 A      10/2012
CN       105691008 A       6/2016
(Continued)

OTHER PUBLICATIONS

Sweet, Michael. et al. "PWG Media Standardized Names 2.0" (MSN2). Mar. 28, 2013, pp. 1-44. Section 3.2 Vendor Media Type Names, p. 15. Candidate Standard 5101.1-2013. The Printer Working Group, Piscataway, NJ, USA.

(Continued)

Primary Examiner — Huo Long Chen
(74) Attorney, Agent, or Firm — Canon U.S.A., Inc. IP Division

(57) ABSTRACT

A printing apparatus includes a reception unit and a determination unit. The reception unit receives a display mode of a sheet type from an information processing apparatus. The determination unit determines sheet type information to be transmitted to the information processing apparatus, based on the display mode of the sheep type received by the reception unit.

3 Claims, 16 Drawing Sheets

(58) Field of Classification Search
CPC ........... H04N 1/00482; H04N 1/00506; H04N 1/00973; H04N 1/2353; G03G 15/5075; G03G 15/5016; G03G 21/00; G06F 3/1205; G06F 3/1232; G06F 3/1253; G06F 3/1285; G06F 3/1203; B41J 29/38
See application file for complete search history.

(56) References Cited

U.S. PATENT DOCUMENTS

| | | | | |
|---|---|---|---|---|
| 2009/0168096 | A1* | 7/2009 | Toda | G06F 3/1288 358/1.15 |
| 2011/0032569 | A1* | 2/2011 | Ohashi | G06F 3/1239 358/1.15 |
| 2011/0109933 | A1 | 5/2011 | Fukuda | |
| 2016/0371573 | A1* | 12/2016 | Fujioka | G06K 15/02 |
| 2019/0303054 | A1 | 10/2019 | Kaneda | |

FOREIGN PATENT DOCUMENTS

| | | | |
|---|---|---|---|
| JP | 2005031956 A | * | 2/2005 |
| JP | 2007102328 A | * | 4/2007 |
| JP | 2007140786 A | | 6/2007 |
| JP | 2007245429 A | | 9/2007 |
| JP | 2007261255 A | | 10/2007 |
| JP | 2007318519 A | | 12/2007 |
| JP | 2011039628 A | | 2/2011 |
| JP | 2014156094 A | | 8/2014 |
| JP | 2018067260 A | | 4/2018 |
| KR | 20150141149 A | | 12/2015 |

OTHER PUBLICATIONS

Sweet, Michael. et al. "IPP: Job and Printer Extensions—Set 3" (JPS3). Jul. 27, 2012, pp. 1-86. Sections: 5.6.37 printer-strings-languages-supported, 5.6.38 printer-strings-uri. Candidate Standard 5100.13-2012. The Printer Working Group, Piscataway, NJ, USA.
Kennedy, Smith. "IPP Message Catalog Tooltips and Help Extensions" (Tooltip). Apr. 19, 2019 (Working draft), pp. 1-12. Summary of Invention. The Printer Working Group, Piscataway, NJ, USA.

* cited by examiner

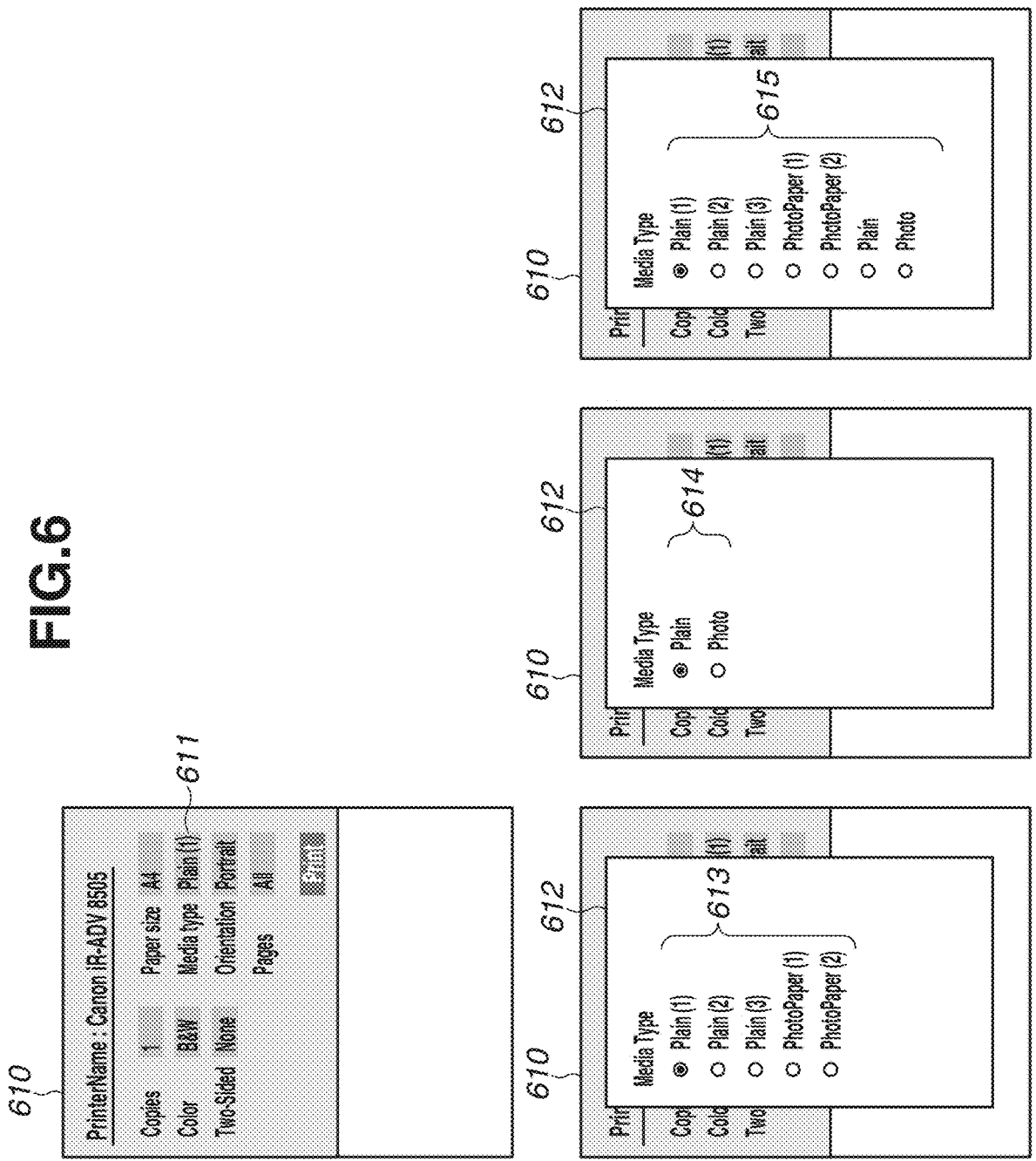

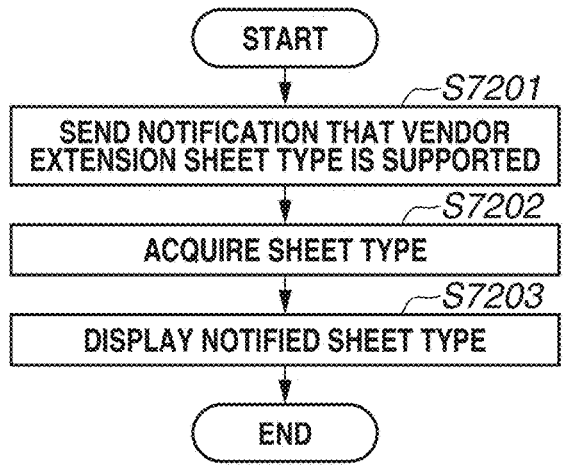
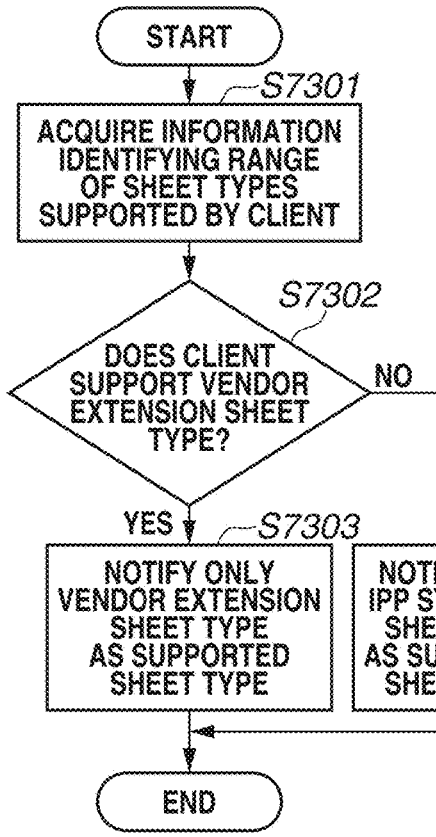
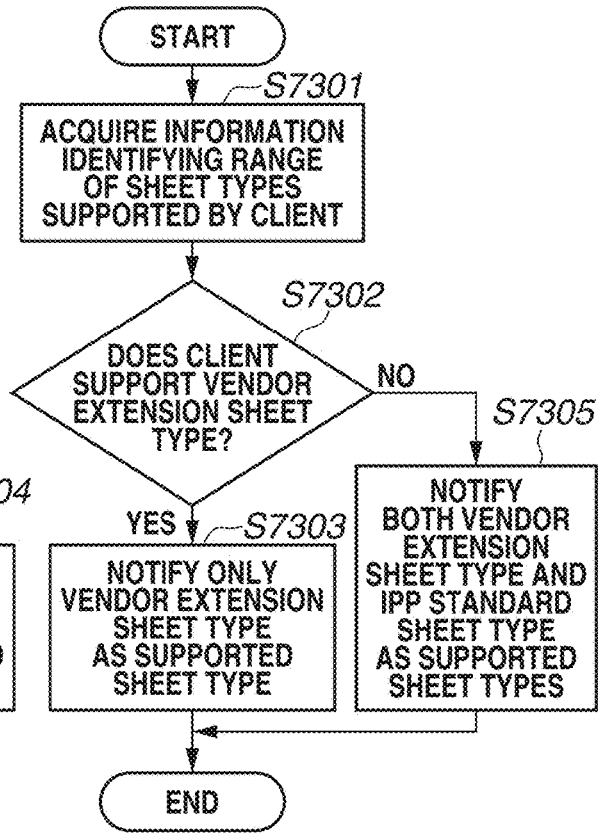

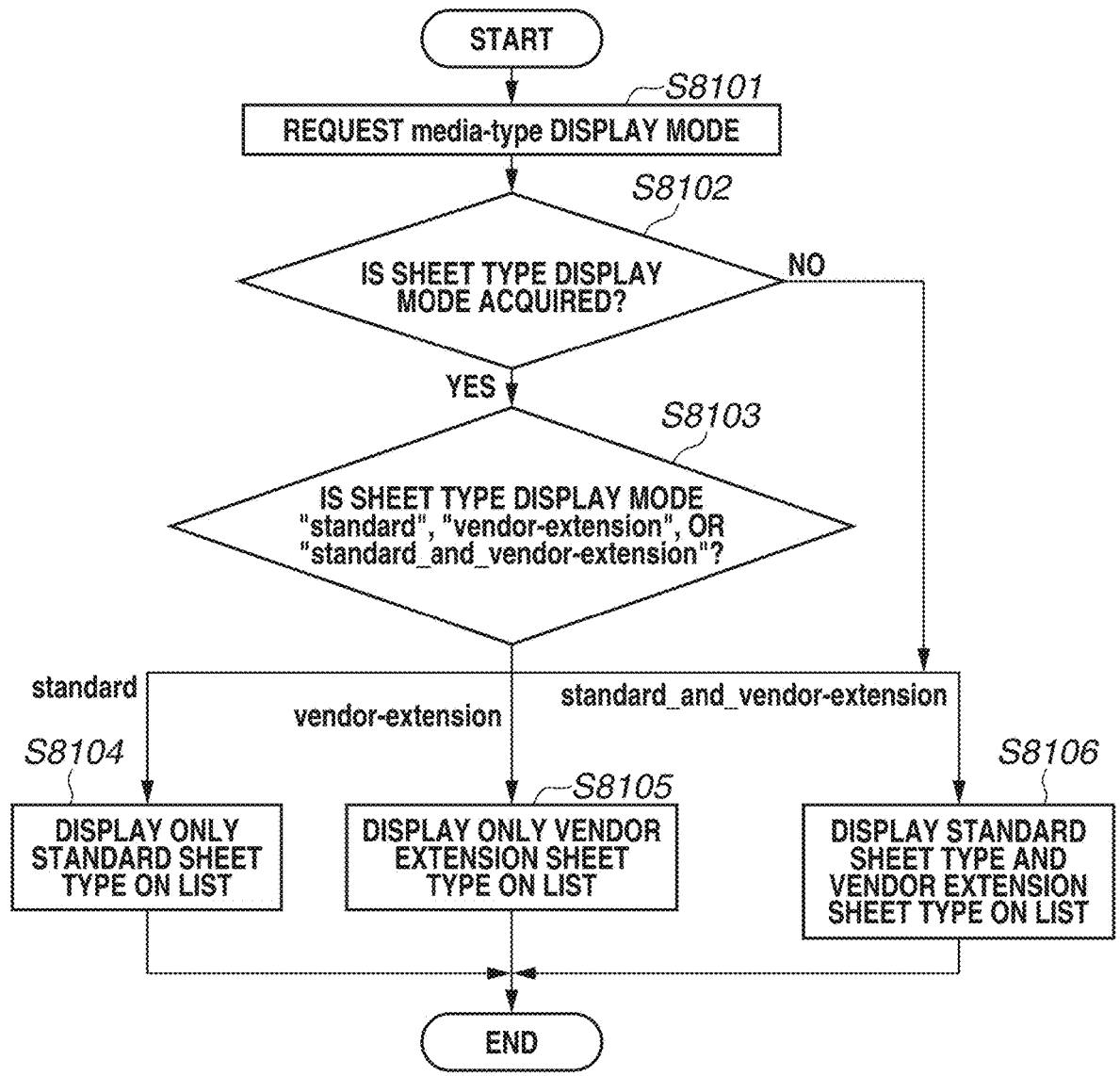

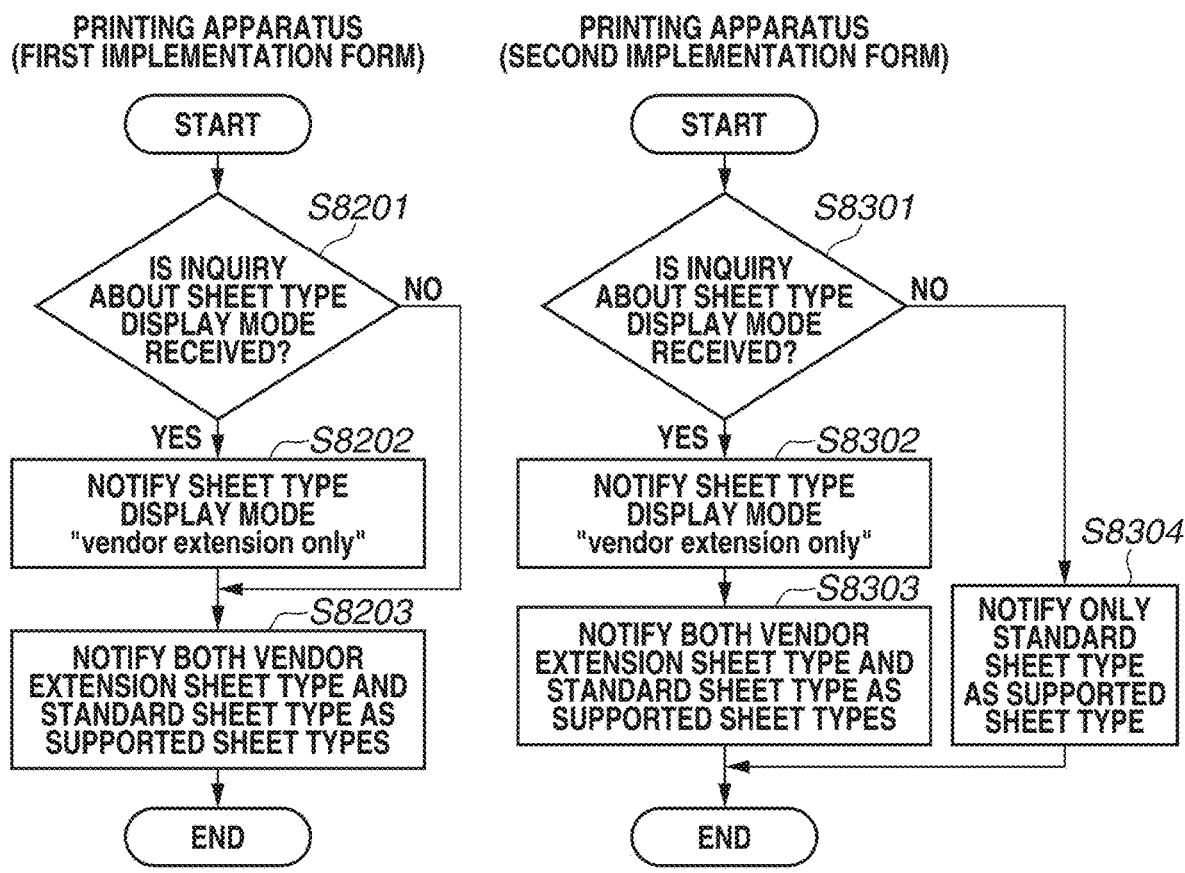

FIG.11A

```
1110 ─  Hypertext Transfer Protocol
           Host: CN-Device.local:631\r\n                              ─ 1111
           User-Agent: CUPS/2.3.0 (sample-os 1.1.1; x64) IPP/2.0\r\n
        Internet Printing Protocol
           version: 2.0
           operation-id: Get-Printer-Attributes (0x000b)
           request-id: 1
           operation-attributes-tag
              attributes-charset (charset): 'utf-8'
                 name: attributes-charset
                 charset value: 'utf-8'
              attributes-natural-language (naturalLanguage): 'ja-jp'
                 name: attributes-natural-language
                 naturalLanguage value: 'ja-jp'
              printer-uri (uri): 'ipp://CN-Device.local:631/ipp/print'
                 name: printer-uri
                 uri value: 'ipp://CN-Device.local:631/ipp/print'
              [truncated]requested-attributes (1setOf keyword):
                 name: requested-attributes
                 keyword value: 'media-supported' ~ 1113
                 keyword value: 'media-type-supported' ~ 1114         ─ 1112
                 keyword value: 'media-type-display-mode' ~ 1115
                 keyword value: 'printer-strings-languages-supported' ~ 1116
           end-of-attributes-tag
```

FIG.11B

```
1120 ─ Hypertext Transfer Protocol
          Server: CN-Device.local:631\r\n
          [Request URI: http://CN-Device.local:631/ipp/print]
        Internet Printing Protocol
          version: 2.0
          status-code: Successful (successful-ok-ignored-or-substituted-attributes)
          request-id: 1
          operation-attributes-tag
             attributes-charset (charset): 'utf-8'
                name: attributes-charset
                charset value: 'utf-8'
             attributes-natural-language (naturalLanguage): 'ja-jp'
                name: attributes-natural-language
                naturalLanguage value: 'ja-jp'
             status-message (textWithoutLanguage): 'successful-ok-ignored-or-substituted-attributes'
                name: status-message
                textWithoutLanguage value: 'successful-ok-ignored-or-substituted-attributes'
          printer-attributes-tag
             ┌──────────────────────────────────────────────────┐
             │ [truncated]media-supported (1setOf keyword):      │
             │    name: media-supported                          │ ─ 1121
             │    keyword value: 'iso_a3_297x420mm'              │
             │    keyword value: 'iso_a4_210x297mm'              │
             └──────────────────────────────────────────────────┘

┌──────────────────────────────────────────────────┐
             │ [truncated]media-type-supported (1setOf keyword): │
             │    name: media-type-supported                     │
             │    keyword value: 'auto'                          │ ─ 1122
             │    keyword value: 'com.canon.stationery1' ┐       │
             │    keyword value: 'com.canon.stationery2' ├─ 1123 │
             │    keyword value: 'com.canon.stationery3' ┘       │
             └──────────────────────────────────────────────────┘

[truncated]media-type-display-mode (1setOf keyword):
                name: media-type-display-mode
                keyword value: 'vendor-extension'

┌──────────────────────────────────────────────────┐
             │ printer-strings-languages-supported (1setOf naturalLanguage): │
             │    name: printer-strings-languages-supported      │ ─ 1125
             │    naturalLanguage value: 'en'                    │
             │    naturalLanguage value: 'ja'                    │
             └──────────────────────────────────────────────────┘
          end-of-attributes-tag
```

FIG.12A

```
1210 ~  Hypertext Transfer Protocol
          Host: CN-Device.local:631\r\n
          User-Agent: CUPS/2.3.0 (sample-os 1.1.1; x64) IPP/2.0\r\n
        Internet Printing Protocol
          version: 2.0
          operation-id: Get-Printer-Attributes (0x000b)
          request-id: 1
          operation-attributes-tag
             attributes-charset (charset): 'utf-8'
                name: attributes-charset
                charset value: 'utf-8'
             attributes-natural-language (naturalLanguage): 'ja-jp'
                name: attributes-natural-language
                naturalLanguage value: 'ja-jp'
             printer-uri (uri): 'ipp://CN-Device.local:631/ipp/print'
                name: printer-uri
                uri value: 'ipp://CN-Device.local:631/ipp/print'
             [truncated]requested-attributes (1setOf keyword):
                name: requested-attributes
                keyword value: 'media-supported'  ~ 1213
                keyword value: 'media-type-supported'  ~ 1214
                keyword value: 'media-type-display-mode'  ~ 1215
                keyword value: 'printer-strings-languages-supported'  ~ 1216
          end-of-attributes-tag
```

FIG.12B

```
1220  Hypertext Transfer Protocol
          Server: CN-Device.local:631\r\n
          [Request URI: http://CN-Device.local:631/ipp/print]
      Internet Printing Protocol
          version: 2.0
          status-code: Successful (successful-ok-ignored-or-substituted-attributes)
          request-id: 1
          operation-attributes-tag
              attributes-charset (charset): 'utf-8'
                  name: attributes-charset
                  charset value: 'utf-8'
              attributes-natural-language (naturalLanguage): 'ja-jp'
                  name: attributes-natural-language
                  naturalLanguage value: 'ja-jp'
              status-message (textWithoutLanguage): 'successful-ok-ignored-or-substituted-attributes'
                  name: status-message
                  textWithoutLanguage value: 'successful-ok-ignored-or-substituted-attributes'
          printer-attributes-tag
              [truncated]media-supported (1setOf keyword):
                  name: media-supported                              ~1221
                  keyword value: 'iso_a3_297x420mm'
                  keyword value: 'iso_a4_210x297mm'

[truncated]media-type-supported (1setOf keyword):
                  name: media-type-supported
                  keyword value: 'auto'
                  keyword value: 'stationery'           }1223        ~1222
                  keyword value: 'com.canon.stationery1'
                  keyword value: 'com.canon.stationery2' }1224
                  keyword value: 'com.canon.stationery3'

[truncated]media-type-display-mode (1setOf keyword):
                  name: media-type-display-mode                      ~1225
                  keyword value: 'vendor-extension' printer-strings-languages-supported (1setOf naturalLanguage):
                  name: printer-strings-languages-supported          ~1226
                  naturalLanguage value: 'en'
                  naturalLanguage value: 'ja'
          end-of-attributes-tag
```

PRINTING APPARATUS CONFIGURED TO TRANSMIT SHEET TYPE INFORMATION, METHOD FOR CONTROLLING THE SAME, AND STORAGE MEDIUM

CROSS-REFERENCE TO RELATED APPLICATIONS

This application is a Continuation of International Patent Application No. PCT/JP2021/004481, filed Feb. 8, 2021, which claims the benefit of Japanese Patent Application No. 2020-026534, filed Feb. 19, 2020, both of which are hereby incorporated by reference herein in their entirety.

BACKGROUND OF THE INVENTION

Field of the Invention

The present invention relates to a printing apparatus configured to transmit sheet type information, a method for controlling the same, and a storage medium.

Background Art

Information processing apparatuses in recent years include a plurality of operating systems (OSs) and the OSs use Internet Printing Protocol (IPP) as a standard print function. IPP allows an information processing apparatus to display a sheet type notified from a printing apparatus in a selectable way on a print setting screen of the information processing apparatus.

Non Patent Literature (NPL) 1 discusses a notification format of vendor extension sheet types that is notified as part of capability information from a printing apparatus (IPP-Server) to an information processing apparatus (IPP-Client). NPL 2 discusses a method for transferring, from a printing apparatus (IPP-Server) to an information processing apparatus (IPP-Client), a character string for displaying a vendor extension sheet type notified by the printing apparatus on a user interface (UI) of the information processing apparatus. NPL 3 discusses a Message Catalog form that is used by a printing apparatus (IPP-Server) to describe a display character string of a vendor extension sheet type to an information processing apparatus (IPP-Client).

CITATION LIST

Non Patent Literature

NPL 1: PWG Media Standardized Names 2.0 3.2 Vendor Media Type Names
NPL 2: IPP: Job and Printer Extensions-Set 3 (5100.13-2012) 5.6.37 printer-strings-languages-supported 5.6.38 printer-strings-uri
NPL 3: IPP Message Catalog Tooltips and Help Extensions
Summary of Invention As described above, transmitting sheet type information and displaying the transmitted information are discussed in the Non-Patent Literatures.

SUMMARY OF THE INVENTION

According to each exemplary embodiment of the present invention, a printing apparatus transmits and receives information to and from an information processing apparatus based on the rules discussed in NPLs 1 to 3 when notification of a vendor extension sheet type as part of capability information is performed.

According to an aspect of the present invention, a printing apparatus includes a reception unit configured to receive a display mode of a sheet type from an information processing apparatus, and a determination unit configured to determine sheet type information to be transmitted to the information processing apparatus, based on the display mode of the sheep type received by the reception unit.

Further features of the present invention will become apparent from the following description of exemplary embodiments with reference to the attached drawings.

BRIEF DESCRIPTION OF THE DRAWINGS

FIG. 6 is a diagram illustrating a print setting screen of the information processing apparatus.
FIG. 7A is a flowchart of the information processing apparatus according to a first exemplary embodiment.
FIG. 7B is a flowchart of the printing apparatus according to the first exemplary embodiment and FIG. 7C is a flowchart of the printing apparatus according to a second implementation form.
FIG. 8A is a flowchart of an information processing apparatus according to a second exemplary embodiment.
FIG. 8B is a flowchart of a printing apparatus according to the second exemplary embodiment.
FIG. 11A is a diagram illustrating an example of a message of Internet Printing Protocol (IPP) communication according to the first exemplary embodiment.
FIG. 11B is a diagram illustrating an example of a message of Internet Printing Protocol (IPP) communication according to the first exemplary embodiment.
FIG. 12A is a diagram illustrating an example of a message of Internet Printing Protocol IPP communication according to the second exemplary embodiment.
FIG. 12B is a diagram illustrating an example of a message of Internet Printing Protocol IPP communication according to the second exemplary embodiment.

DESCRIPTION OF THE EMBODIMENTS

Figure 13:
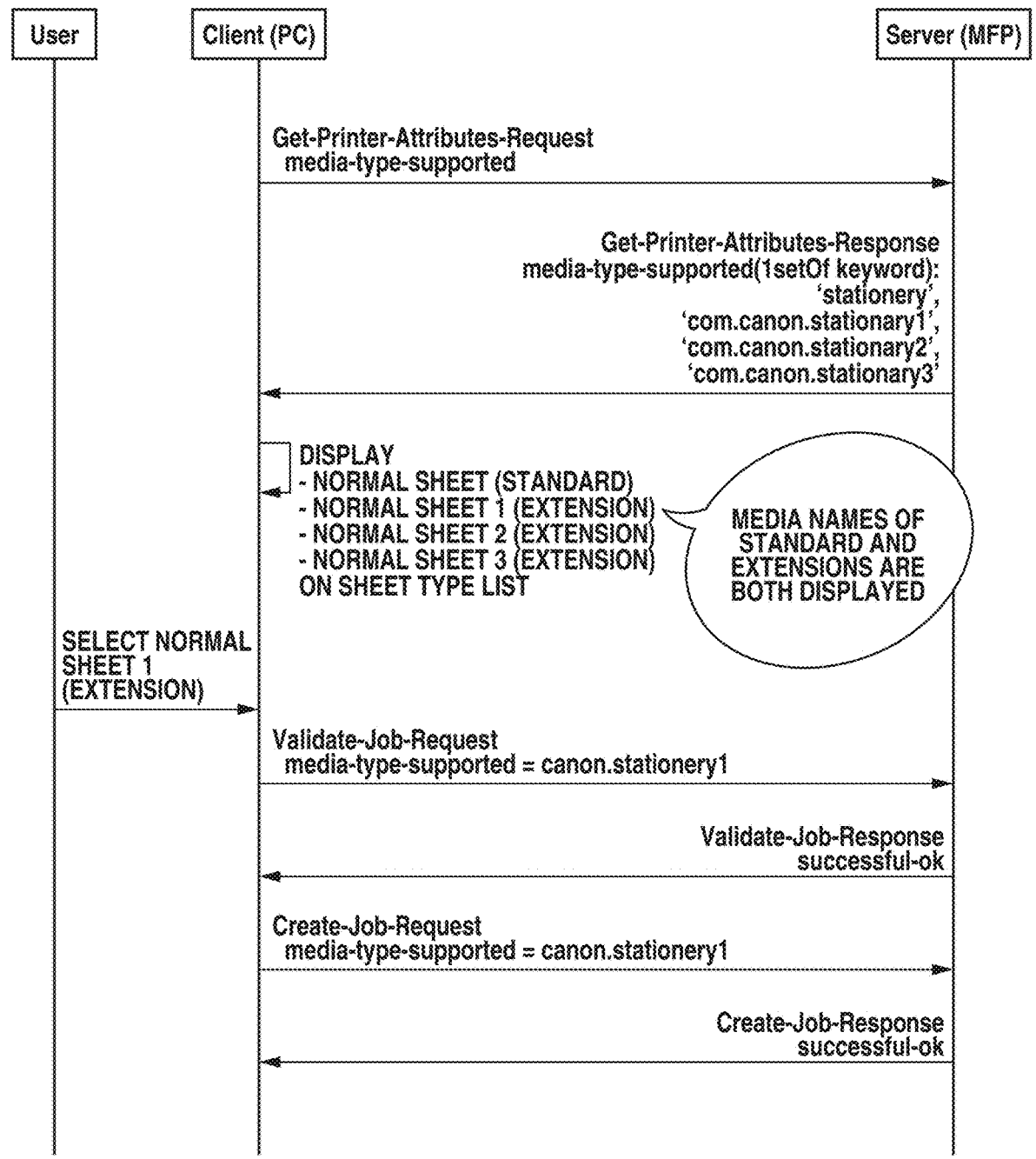
FIG. 13 is a diagram illustrating an issue of selecting a sheet type including vendor extension sheet types.

A first exemplary embodiment will be described below.
There are two methods for selecting a sheet type in a printing system including an information processing apparatus based on Internet Printing Protocol (IPP) and a printing apparatus. The two methods are "standard sheet type (also referred to as "standard attribute sheet type")" defined in IPP standards and "vendor extension sheet type" based on IPP extension rules. In both case of the sheet types, information about supported sheet types is notified from the printing apparatus to the information processing apparatus. However, methods, including interpretations on the information processing apparatus, to realize displaying of a sheet name on a UI are different from each other. With respect to "IPP standard sheet type", the information processing apparatus includes a resource of a display character string that is paired with a sheet type identifier (ID) notified from the printing apparatus. With respect to "vendor extension sheet type", on the other hand, the printing apparatus provides both the sheet type ID and the resource of the display character string in response to a request from the information processing apparatus. Conventional systems among IPP-based printing systems are a printing system using only IPP standard sheet types and a printing system of a hybrid type using IPP standard sheet types and some vendor extension sheet types added to part of the IPP standard sheet types. Although IPP standard sheet types have the same sheet type ID, display character strings corresponding to the IPP standard sheet types do not match exactly between an information processing apparatus and a printing apparatus in a case where an IPP-Client implementor/provider of the information processing apparatus and an IPP-Server implementor/provider of the printing apparatus are different from each other. Furthermore, there are cases where a vendor extension sheet type and an IPP standard sheet type that have the same meaning are displayed doubly, which confuses a user in selecting/setting a sheet (FIG. 13). Thus, according to the first exemplary embodiment, a printing apparatus notifies an information processing apparatus of either vendor extension sheet types only or both IPP standard sheet types and vendor extension sheet types, in accordance with a sheet type display capability of the information processing apparatus. Since the printing apparatus changes a sheet type list in a capability notification as described above, only necessary sheet type information is displayed.

Figure 1:
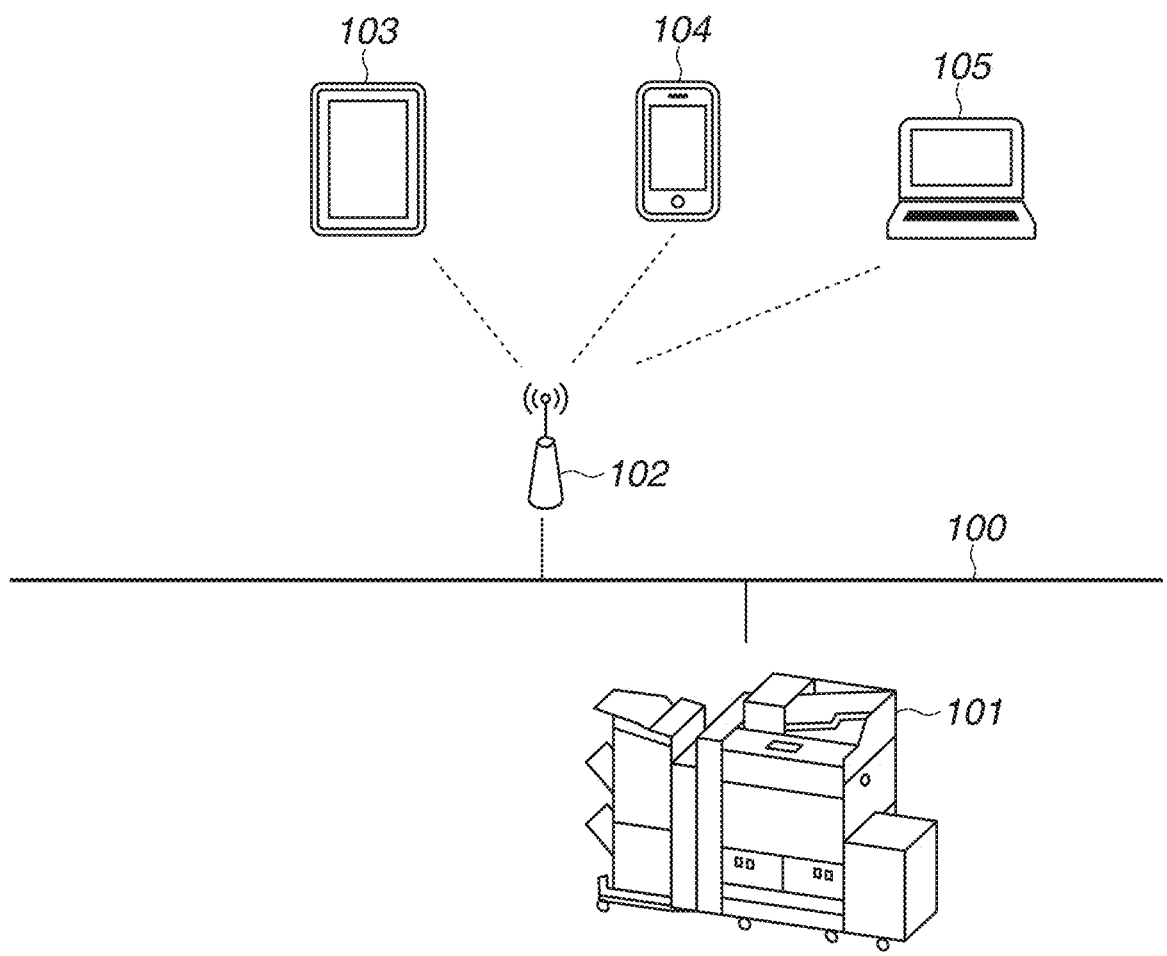
FIG. 1 is a diagram illustrating a system configuration.

FIG. 1 will be described below. FIG. 1 is a diagram illustrating a configuration of a printing system according to an aspect of the present invention. A printing apparatus (101) is on a local area network (LAN) (100), and an information processing apparatus is connected to the LAN (100) via an access point (AP) (102). Mobile terminals (103, 104, 105) such as a tablet, a smartphone, and a personal computer (PC) will be described below as an example of an information processing apparatus in this implementation form. Hereinafter, the tablet, the smartphone, and the PC are collectively referred to as information processing apparatus. The information processing apparatus performs printing using the printing apparatus (101) on the LAN (100). While the foregoing configuration is described as an example of a configuration of the printing system according to the present exemplary embodiment, the present invention is not limited to the described configuration, and any configurations in which at least one or more information processing apparatuses and a printing apparatus are connected together via a network to communicate with each other can be used. Further, the network can be a wireless network or a wired network.

First, the printing apparatus (101) will be described below. The printing apparatus (101) includes a print function of printing images on sheets (recording mediums). The printing apparatus (101) is capable of printing print data received from the information processing apparatus via a network.

Figure 2:
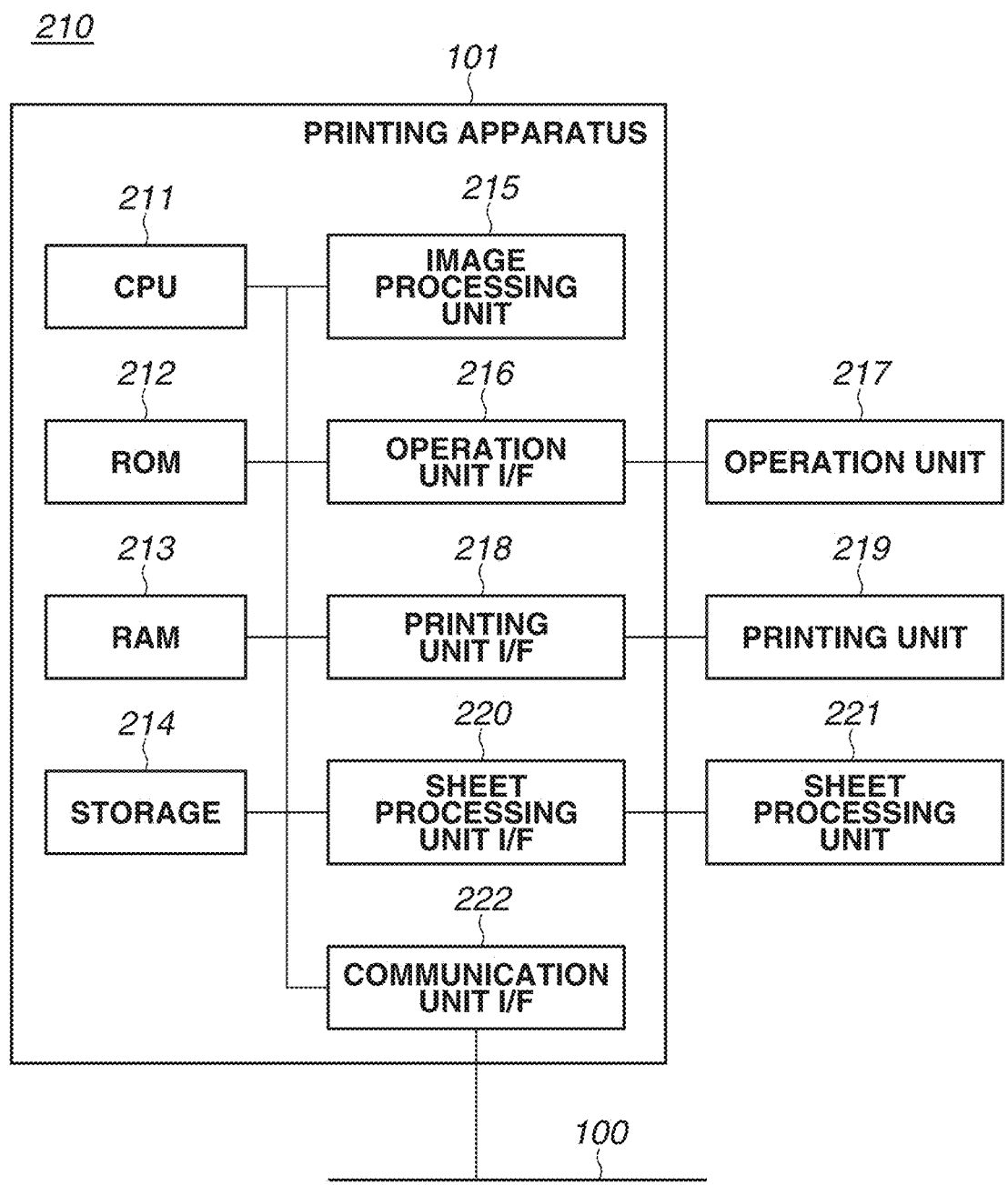
FIG. 2 is a diagram illustrating a hardware configuration of a printing apparatus.
Figure 4:
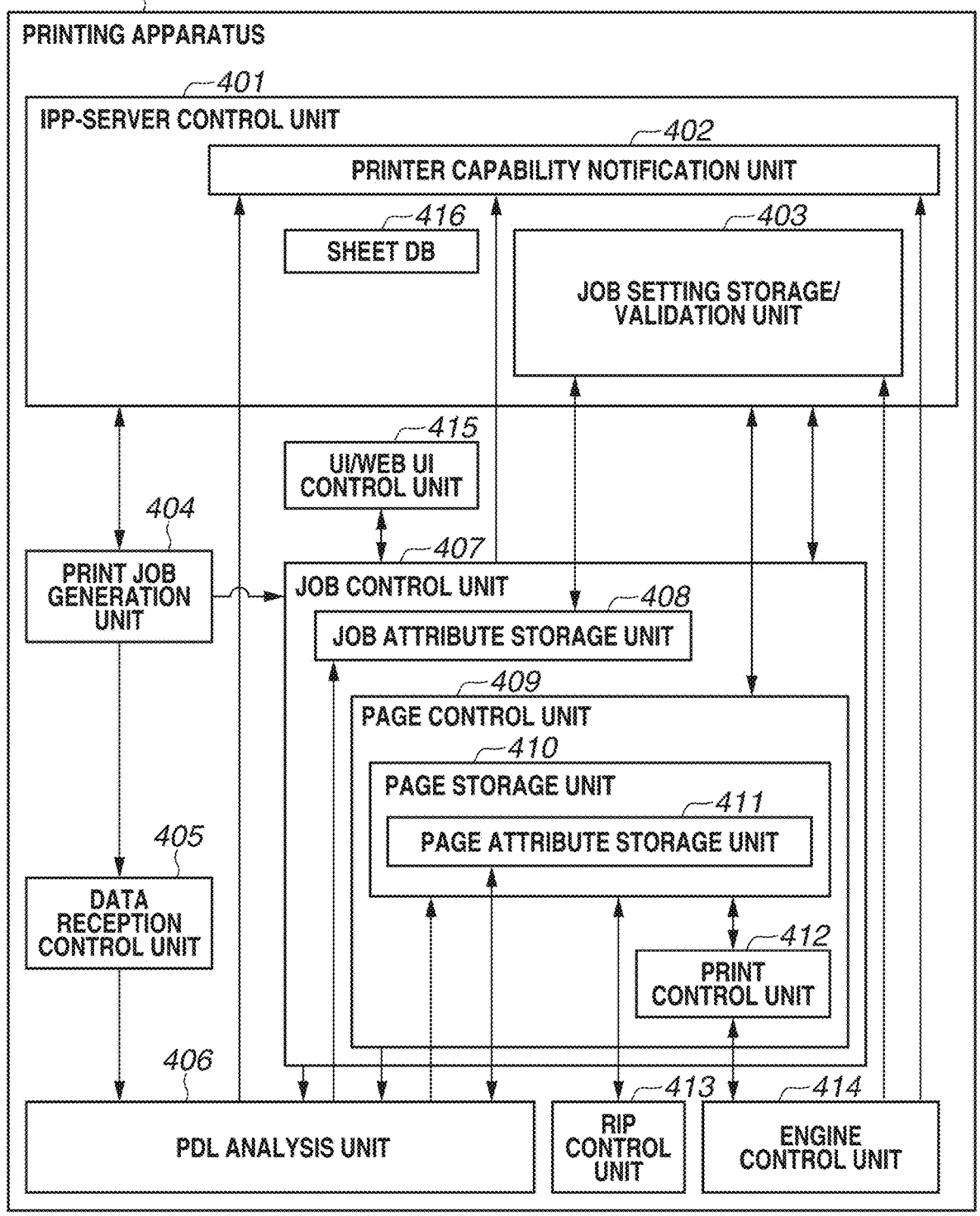
FIG. 4 is a diagram illustrating a software configuration of the printing apparatus.

FIG. 2 is a diagram illustrating a hardware configuration of the printing apparatus (101). FIG. 4 is a diagram illustrating a software configuration of the printing apparatus. A block diagram of a control unit (210) in FIG. 2 illustrates a hardware configuration of the printing apparatus (101) according to the present exemplary embodiment. While the printing apparatus (101) is described as an example according to the present exemplary embodiment, a printing apparatus, such as a multi-function peripheral (MFP) including a scanner function and a facsimile function, can be used. The control unit (210) including a central processing unit (CPU) (211) controls operations of the entire printing apparatus (101). The CPU 211 loads a program stored in a read-only memory (ROM) (212) or in a storage (214) to a random access memory (RAM) (213) and executes the loaded program to perform various types of control, such as printing control and reading control. The ROM (212) stores control programs and boot programs that are executable by the CPU (211). The RAM (213) is a main memory of the CPU (211) and is used as a work area or a temporary storage area for loading various control programs. The storage (214) stores print data, image data, various programs, and various settings information. While the storage (214) according to the present exemplary embodiment is an auxiliary storage device, such as a hard disk drive HDD, a non-volatile memory, such as a solid state drive (SSD), can be used.

While the single CPU (211) performs processes illustrated in flowcharts described below using a single memory (RAM 213) in the printing apparatus (101) according to the first exemplary embodiment, any other forms can be used. For example, a plurality of CPUs, a plurality of RAMs, a plurality of ROMs, and a plurality of storages can cooperate together to perform the processes in the flowcharts described below. Further, part of the processes can be performed using a hardware circuit, such as an application specific integrated circuit (ASIC) or a field-programmable gate array (FPGA).

An operation unit interface (I/F) (216) connects an operation unit (217) and the control unit (210) together. The operation unit (217) includes a display unit having a touch panel function and various hardware keys. The operation unit (217) functions as a display unit that displays information and as a reception unit that receives user instructions. A printing unit I/F (218) connects a printing unit (219) and the control unit (210) together. Image data generated by analyzing a print job received from the information processing apparatus is transferred from the control unit (210) to the printing unit (219) via the printing unit I/F (218). The printing unit (219) receives a control command and a print job to be printed via the control unit (210) and prints an image on a sheet fed from a sheet feeding cassette (not illustrated) based on the print job. The printing unit (219) can use an electrophotographic method or an inkjet method as a printing method. Further, other printing methods, such as a thermal transfer method, are also applicable. Further, the control unit (210) is connected to the LAN (100) via a communication unit I/F (222). The communication unit I/F (222) transmits information to the information processing apparatus (103, 104, 105) and receives print jobs and information from the information processing apparatus (103, 104, 105) on the LAN (100).

An image processing unit (215) has a raster image processor (RIP) function of developing a job received from the information processing apparatus (103, 104, 105) and generating print image data. Further, the image processing unit (215) performs resolution conversion processing and correction processing on image data obtained by developing a print job. According to the present exemplary embodiment, the image processing unit (215) is realized by, but not limited to, a hardware circuit (e.g., ASIC or FPGA). Alternatively, the printing apparatus (101) can further include a processor for use in image processing, and the processor can execute an image processing program to perform image processing and development processing for the development into print data. In this case, the processor and the CPU (211) cooperate together to realize the flowcharts described below. Furthermore, the CPU (211) can execute a program for performing image processing to perform image processing and development processing for the development into print data. Further, the image processing can be performed by a combination of any of the above.

A sheet processing unit I/F (220) connects the control unit (210) and a sheet processing unit (221) together. The sheet processing unit (221) receives a control command from the control unit (210) and performs post-processing on a sheet printed by the printing unit (219), based on the control command.

FIG. 4 is a functional block diagram illustrating a software configuration of the printing apparatus (101) according to the first exemplary embodiment. Each functional block illustrated in FIG. 4 is realized by the CPU (211) executing a program loaded to the RAM (213).

An IPP-Server control unit (401) includes a printer capability notification unit (402). The printer capability notification unit (402) receives an inquiry about a capability from the information processing apparatus (103, 104, 105) to the printing apparatus (101) and notifies printer capability information in response to the inquiry. Specific examples of capability information to be notified are, sheet size: media-size,
sheet type: media-type, and
sheet type display mode: media-type-display-mode.

An IPP attribute that relates to the sheet type display mode is a new attribute for an inquiry about a sheet type display method from the information processing apparatus (103, 104, 105) to the printing apparatus (101) and is defined in the present specification (none of the above NPLs discuss the new attribute). The IPP-Server control unit (401) determines whether an IPP-Client on the information processing apparatus (103, 104, 105) supports displaying of vendor extensions, based on information (IPP-Client name, Client Version, an attribute name included in a request for a capability, a value range of the attribute name) included in the request (i.e., Get-Printer-Attributes-Request) for capability information about the printing apparatus (101) from the information processing apparatus (103, 104, 105). In a case where the IPP-Server control unit (401) determines that displaying of vendor extensions is supported, the IPP-Server control unit (401) determines to notify (transmit) only capability information about vendor extension sheet types selectively from among sheet information managed by a sheet database (DB) (416). In a case where the IPP-Server control unit (401) determines that displaying of vendor extensions is unsupported, the IPP-Server control unit (401) determines to notify (transmit) capability information about IPP standard sheet types only or capability information about both IPP standard sheet types and vendor extension sheet types.

After acquiring the capability of the printer, the information processing apparatus (103, 104, 105) generates a print job suitable for the printer and transmits the generated print job to the printing apparatus (101). The IPP-Server control unit (401) performs processing to receive print data from the information processing apparatus (103, 104, 105).

In a case where an IPP print job is received from the information processing apparatus (103, 104, 105), a new job is generated for a job control unit (407) via a print job generation unit (404). Then, a job setting storage/validation unit (403) validates a job attribute specified by the IPP attribute and writes the job attribute to a job attribute storage unit (408).

Examples are the number of copies to be printed, sheet size, sheet type, finishing, and page description language (PDL) format information. The IPP-Server control unit (401) transfers drawing data of job data to a data reception control unit (405) and temporarily stores the data in parallel with the attribute processing. The data reception control unit (405) is a buffer area for the print job received by the print job generation unit (404) and stores data for each print job in the storage (214).

A PDL analysis unit (406) of the printing apparatus (101) according to the present exemplary embodiment supports Portable Document Format (PDF) and Printer Working Group (PWG)-Raster format. The PDL analysis unit (406) requests print drawing data from the data reception control unit (405), based on an instruction from the job control unit (407) and performs analysis processing. A page control unit (409) stores image data on page data generated by the PDL analysis unit (406) in a page storage unit (410) and stores page attribute information about the page data in a page attribute storage unit (411).

The page control unit (409) controls page analysis processing by the PDL analysis unit (406), RIP processing by a RIP control unit (413), and print control processing by a print control unit (412). The print control unit (412) acquires image data having undergone the RIP processing from the page storage unit (410), divides the image data into red, green, and blue (RGB) colors, and transfers the divided RGB image data to an engine control unit (414). The engine control unit (414) receives the RGB image data in units of pages from the print control unit (412), controls the print control unit (412), and performs processing to print each page. A UI/web UI control unit (415) acquires information about a status of a print job being processed from the job control unit (407) and displays the processing status of the print job on a UI screen.

Figure 3:
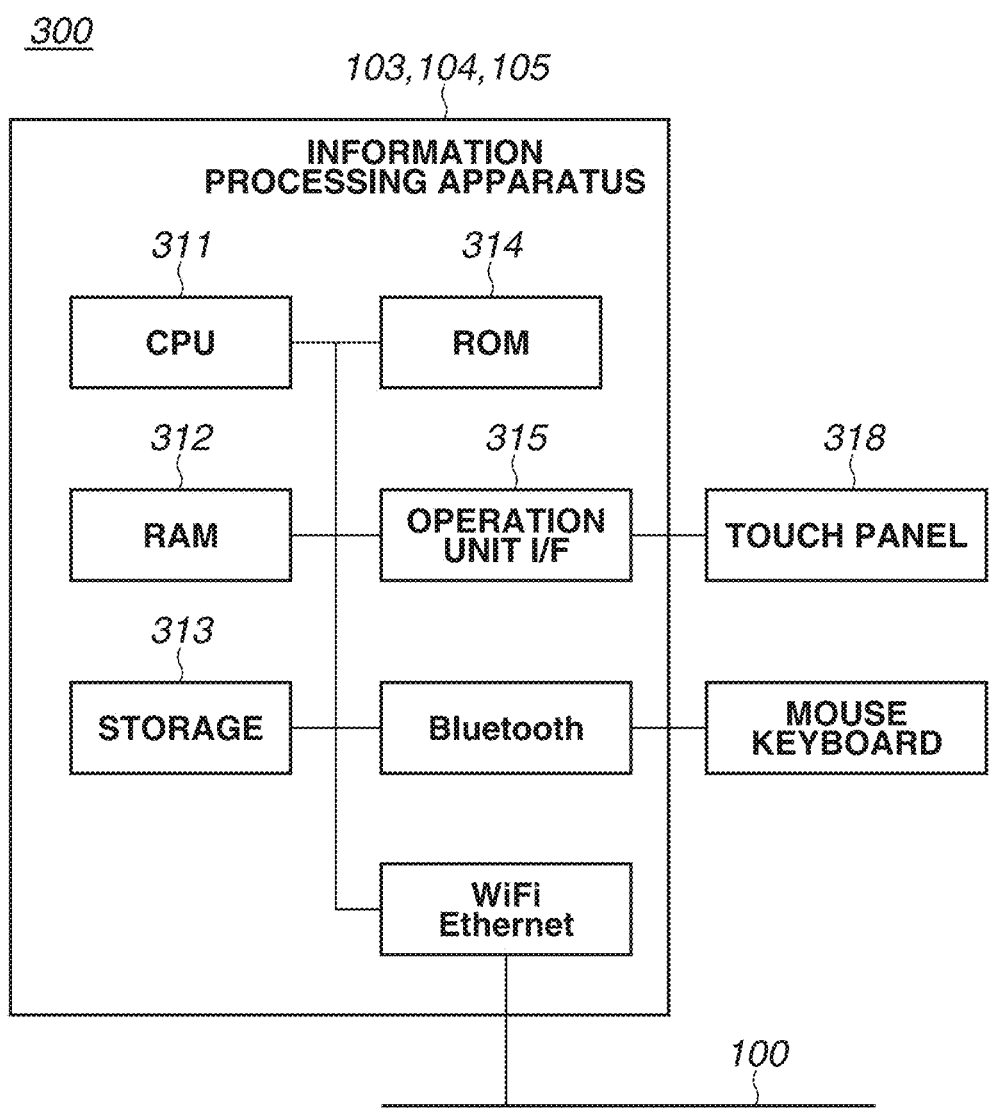
FIG. 3 is a diagram illustrating a hardware configuration of an information processing apparatus.
Figure 5:
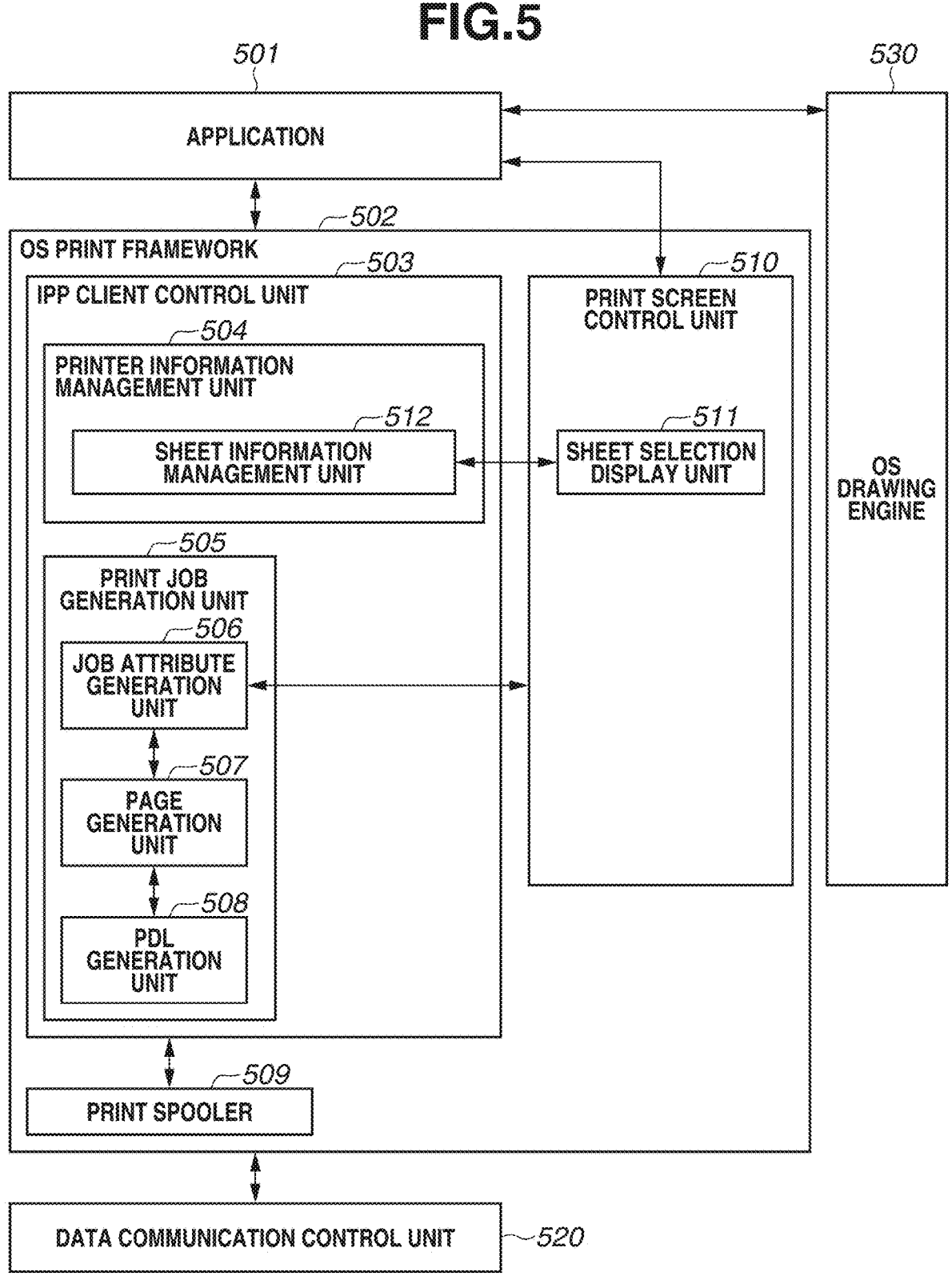
FIG. 5 is a diagram illustrating a software configuration of the information processing apparatus.

FIG. 3 is a diagram illustrating a hardware configuration of the information processing apparatus (103, 104, 105), and FIG. 5 is a diagram illustrating a software configuration of the information processing apparatus (103, 104, 105). A control unit (300) including a CPU (311) controls operations of the entire information processing apparatus (103, 104, 105). The CPU (311) loads a program stored in a ROM (314) or in a storage (313) to a RAM (312) and executes the loaded program to perform various types of control to control a print setting screen, to generate print data, and to transfer a print job. The ROM (314) stores a control program and a boot program that are executable by the CPU (311). The RAM (312) is a main storage memory of the CPU (311) and is used as a work area or as a temporary storage area for loading various programs. The storage (313) stores an OS, an application, an OS print framework, a print job generated by the OS print framework, and various settings information. While the storage (313) according to the present exemplary embodiment is an auxiliary storage device, such as a HDD, a non-volatile memory, such as a SSD, can be used. A touch panel (318) is connected to an operation unit I/F (315) and issues not only a notification about screen drawings to an application or the print setting screen but also a notification about touch operations performed by the user to the application operating on the CPU (311).

FIG. 5 is a diagram illustrating a software configuration of the information processing apparatuses (103, 104, 105). Each functional block is realized by the CPU (311) executing a program loaded to the RAM (312). An application (501) is an application that is installed on the information processing apparatus (103, 104, 105) by the user and is a general application, such as a word processor application, a spreadsheet application, a database application, an e-mail application, or a web browser application. An OS print framework (502) includes an IPP print client control unit (503), a print spooler (509), and a print screen control unit (510). The IPP print client control unit (503) includes a printer information management unit (504) and a print job generation unit (505). The printer information management unit (504) transmits an inquiry to the printing apparatus (101) via a data communication control unit (520) to acquire capability information about the printing apparatus (101) and stores the acquired capability information.

The acquired information contains:
sheet size: media-size,
sheet type: media-type, and
sheet type display mode: media-type-display-mode,
which are described above.

A sheet selection display unit (511) and the print job generation unit (505) of the print screen control unit (510) refer to the acquired information. The print screen control unit (510) displays a print screen in response to a call from the application (501). The user sets print settings via the print screen and executes printing. To display print setting items on the print screen, the information processing apparatus (103, 104, 105) acquires capability information about functions providable from the printing apparatus (101) and displays a setting screen and setting items within the providable range. The print job generation unit (505) includes a job attribute generation unit (506), a page generation unit (507), and a PDL generation unit (508). The print job generation unit (505) receives an instruction from the print screen control unit (510) and generates a print job based on the instruction. The job attribute generation unit (506) generates a job attribute and a document attribute of an IPP job based on the setting items on the print screen. The page generation unit (507) cooperates with the PDL generation unit (508) to convert drawing data generated by the application (501) using an OS drawing engine (530) into PDL data supported by the printing apparatus (101) and transmits the PDL data to the printing apparatus (101).

The print screen control unit (510) and the print job generation unit (505) acquire sheet sizes and sheet types supported by the printing apparatus (101) from a sheet information management unit (512) of the printer information management unit (504) and designates a sheet size and a sheet type for each job or each page in print data. The OS drawing engine (530) draws print page data in OS standard drawing format and transmits the drawn print page data to the page generation unit (507) of the OS print framework (502) based on a request from the application (501). The data communication control unit (520) transmits and receives, to and from the printing apparatus (101), messages for communication for printer management, messages for job transmission, and messages for job management that are generated by the IPP client control unit (503).

FIG. 6 will be described below. FIG. 6 illustrates a print setting screen of the information processing apparatus (103, 104, 105). The user can select a sheet size and a sheet type in the print setting screen (610) from the sheet sizes and the sheet types that are notified from the printing apparatus (101). The print setting screen (610) is a print setting screen that is called first from the application (501) when the print function is executed. A sheet size and a sheet type are settable as setting items, and a sheet type selection list screen (612) is displayed at the press of the sheet type selection menu (611) by the user. A display example (613) is an example of a display in which only vendor extension sheet types are listed as sheet types. A display example (614) is an example of a display in which only IPP standard sheet types are listed. A display example (615) is an example of a display in which both vendor extension sheet types and IPP standard sheet types are listed. According to the first exemplary embodiment, the sheet type list displays (613, 614, 615) are realized by the sheet selection display unit (511) by transmitting an inquiry to the sheet information management unit (512). According to a second exemplary embodiment, the sheet selection display unit (511) switches the sheet type list displays (613, 614, 615), based on a sheet type display mode notified from the information processing apparatus (103, 104, 105).

FIGS. 7A, 7B, and 7C will be described below.

FIG. 7A is a flowchart of the information processing apparatus according to a first exemplary embodiment. First, a procedure of acquiring a sheet type by the information processing apparatus (103, 104, 105) will be described below. The information processing apparatus (103, 104, 105) supports both IPP standard sheet types and vendor extension sheet types. In step (S7201), the IPP client control unit (503) for acquiring capability information notifies the printing apparatus (101) that the information processing apparatus (103, 104, 105) is an IPP-Client supporting displaying and settings of vendor extension sheet types. In step (S7202), a list of sheet types that the printing apparatus (101) supports is acquired, and the acquired list is stored in the sheet information management unit (512). In step (S7203), all the sheet types that are acquired from the printing apparatus (101) are displayed directly in a sheet type selection section of the print setting screen. Thus, in a case where the notified sheet types include both IPP standard sheet types and vendor extension sheet types, the IPP standard sheet types and the vendor extension sheet types are both displayed.

Next, a procedure of notifying sheet types by the printing apparatus (101) will be described below. The printing apparatus (101) supports both IPP standard sheet types and vendor extension sheet types. Two procedures of generating sheet types that are to be notified to the information processing apparatus (103, 104, 105) by the printing apparatus (101) will be described below.

FIG. 7B is a flowchart of the printing apparatus according to the first exemplary embodiment. In a first implementation form, in step (S7301), the printing apparatus (101) acquires any form of identification information about a capability of displaying sheet types that the information processing apparatus (103, 104, 105) supports. In step (S7302), whether the information processing apparatus (103, 104, 105) is capable of displaying vendor extensions is determined based on an acquired identifier. In a case where displaying of vendor extensions is supported, only vendor extension sheet types are notified to the information processing apparatus (103, 104, 105) (steps (S7302) and (S7303)). On the other hand, in a case where it is determined that displaying of vendor extensions is unsupported or the acquisition of identification information from the information processing apparatus (103, 104, 105) in step (S7301) fails, only IPP standard sheet types are notified (step (S7304)).

FIG. 7C is a flowchart of the printing apparatus according to a second implementation form. In a second implementation form, in a case where it is determined that vendor extension sheet types are unsupported or the acquisition of identification information from the information processing apparatus (103, 104, 105) in step (S7301) fails, both standard sheet types and vendor extension sheet types can be notified (step (S7305)).

Figure 9:
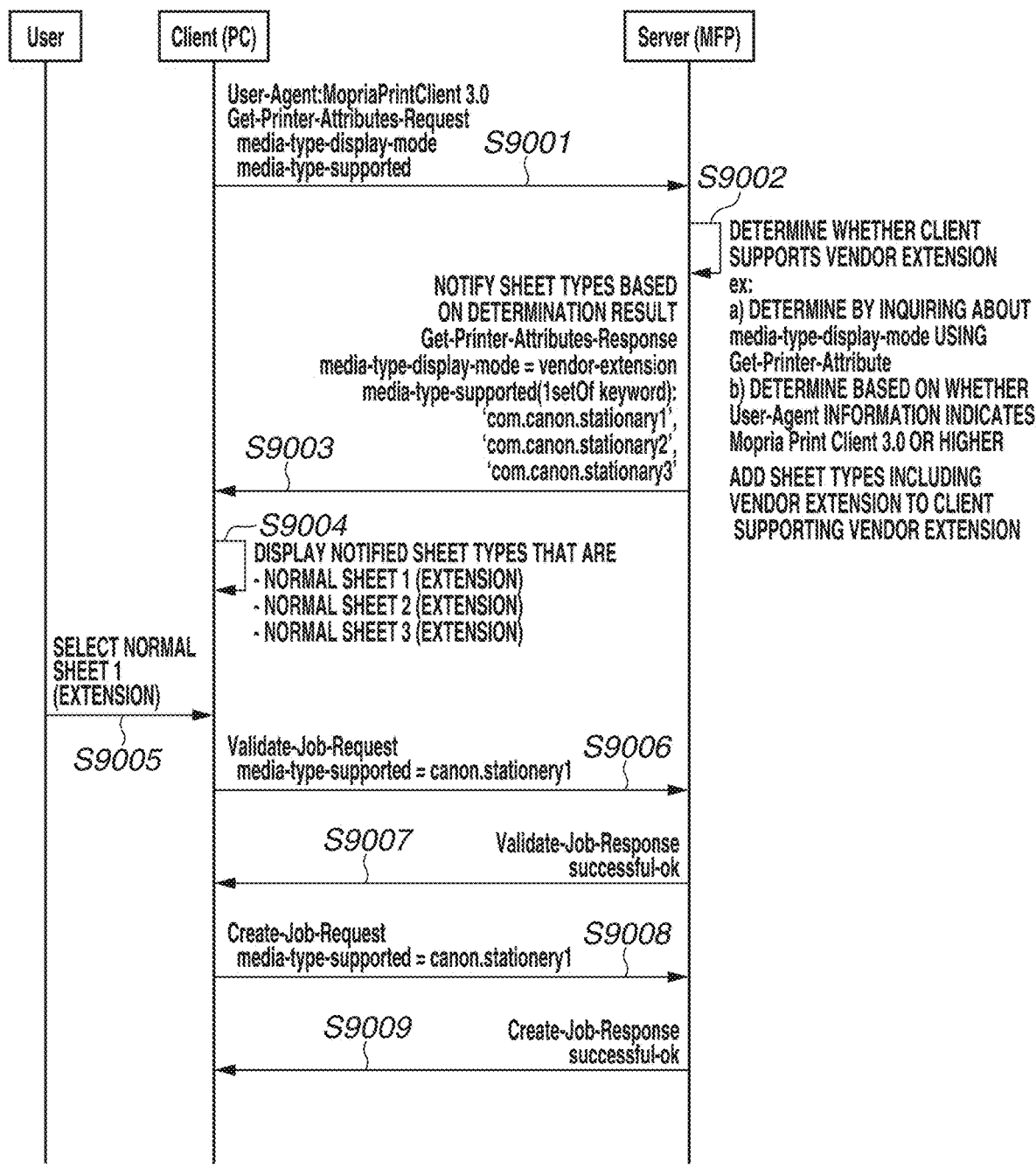
FIG. 9 is a diagram illustrating a sequence of the information processing apparatus and the printing apparatus according to the first exemplary embodiment.

FIG. 9 illustrates a sequence of acquiring sheet types from the printing apparatus (101) by the information processing apparatus (103, 104, 105), displaying the sheet types, selecting a sheet type, and generating a job as a print attribute. In step (S9001), the information processing apparatus (103, 104, 105) transmits a request for capability information to the printing apparatus (101). This request message includes an inquiry about supported sheet types. In this process, the information processing apparatus (103, 104, 105) includes identification information about a type and a version of the IPP-Client in an IPP header in a User-Agent. Alternatively, the IPP-Client of the information processing apparatus (103, 104, 105) can transmit an inquiry for a specific IPP attribute (e.g., media-type-display-mode attribute described below) when acquiring capability information about the printing apparatus (101), in order to indicate supporting of displaying of vendor extensions. In step (S9002), the IPP-Server control unit (401) and the printer capability notification unit (402) of the printing apparatus (101) determine whether the information processing apparatus (103, 104, 105) supports displaying of vendor extensions, based on a form (User-Agent information of the IPP header) of the request for capability from the information processing apparatus (103, 104, 105) and attribute information included in the request for capability information. The printer capability notification unit (402) cooperates with the sheet DB (416), and in a case where the IPP-Client of the information processing apparatus (103, 104, 105) supports displaying of vendor extensions, a list including vendor extension sheet types only is generated. On the other hand, in a case where it is undeterminable whether displaying of vendor extensions is supported, a list of sheet type information about both vendor extension sheet types and IPP standard sheet types is generated. Details the processing will be described below with reference to a sample communication message in FIGS. 11A and 11B. In step (S9003), the IPP-Server of the printing apparatus (101) transmits a notification of the capability information about the sheet types generated in step (S9002) as a Get-Printer-Attributes-Response to the IPP-Client of the information processing apparatus (103, 104, 105). In step (S9004), the IPP-Client of the information processing apparatus (103, 104, 105) displays the notified sheet types on the print screen. In step (S9005), the user selects a sheet type on the print screen and then selects a print button. In steps (S9006) to (S9009), the sheet type selected as a print attribute of the IPP job by the user is added to a print setting validation request (Validate-Job), and a job is transmitted (Print-Job).

FIGS. 11A and 11B will be described below. FIGS. 11A and 11B illustrate samples of IPP communication messages according to the present exemplary embodiment. A message (1110) is a request for capability information from the information processing apparatus (103, 104, 105) to the printing apparatus (101), and a message (1120) is a response to the message (1110) from the printing apparatus (101) to the information processing apparatus (103, 104, 105). A method for acquiring a list of supported sheet types from the printing apparatus (101) by the information processing apparatus (103, 104, 105) is a request (1113) and a response (1121) of a media-supported attribute, and an IPP standard sheet size list is notified. A method for acquiring a list of supported sheet types from the printing apparatus (101) by the information processing apparatus (103, 104, 105) is a request (1114) and a response of a sheet type (1122) of a media-type-supported attribute, and one or both of vendor extension sheet types and IPP standard sheet types are listed. According to the present exemplary embodiment, the printing apparatus (101) determines whether the information processing apparatus (103, 104, 105) supports displaying of vendor extension sheet types, based on the content of the message (1110) of the request from the information processing apparatus (103, 104, 105). Specifically, for example, the determination is performed based on User-Agent information included in an IPP header (1111). Alternatively, the determination is performed based on whether a capability information inquiry instruction (1112) from the information processing apparatus (103, 104, 105) includes a media-type-display-mode attribute (1115) relating to displaying of vendor extension sheet types. Specifically, in a case where the media-type-display-mode attribute (1115) is included, it is determined that displaying of vendor extensions is supported, whereas in a case where media-type-display-mode attribute (1115) is not included, it is determined that displaying of vendor extensions is unsupported. Alternatively, the determination is performed based on both of the information. Only in a case where it is determined that displaying of vendor extensions is supported, the printing apparatus (101) transmits a notification of capability information containing only vendor extension sheet types (1123) in values of the sheet type (1122). The phrase "displaying of vendor extensions is supported" means that displaying of vendor extension sheet types only is allowed, i.e., displaying of standard attribute sheet types is optional. Further, the phrase "displaying of vendor extensions is unsupported" means that displaying of vendor extension sheet types only is not allowed, i.e., displaying of vendor extension sheet types only cannot be performed, i.e., displaying of standard attribute sheet types is necessary.

A method for acquiring a message/catalog display language from the printing apparatus (101) by the information processing apparatus (103, 104, 105) is a request (1116) and a response (1125) of a printer-strings-languages-supported attribute. The information processing apparatus (103, 104, 105) acquires character strings for displaying vendor extension sheet types by acquiring a message/catalog of the language notified by the method.

As described above, the IPP-Server control unit (401) and the printer capability notification unit (402) of the printing apparatus (101) identify a sheet type display capability of the information processing apparatus (103, 104, 105) and change sheet types to be notified, based on the identification result, as suitable for the information processing apparatus (103, 104, 105). Specifically, notifying vendor extensions only and notifying both IPP standard sheet types and vendor extension sheet types are switched. Thus, the information processing apparatus (103, 104, 105) supporting displaying of vendor extensions can provide a designation method consisting of only vendor extension sheet types, in a case of a combination with the printing apparatus (101) that transmits a capability notification of all sheet types as vendor extension sheet types. This realizes a uniform display of sheet types on the printing apparatus (101) and on the information processing apparatus (103, 104, 105) and, furthermore, is a solution to a duplicate display of sheet types, whereby user operability improves.

A second exemplary embodiment will be described below.

According to the second exemplary embodiment, the printing apparatus (101) notifies both IPP standard sheet types and vendor extension sheet types to the information processing apparatus (103, 104, 105), and the information processing apparatus (103, 104, 105) acquires an instruction about a sheet type display method from the printing apparatus (101) separately from the sheet type list. The printing apparatus (101) instructs the information processing apparatus (103, 104, 105) to generate either a selection list including vendor extension sheet types only or a selection list including both IPP standard sheet types and vendor extension sheet types according to the present exemplary embodiment.

FIGS. 1 to 3, 5, and 6 are similar to those according to the first exemplary embodiment, so that the redundant descriptions are omitted.

According to the second exemplary embodiment, the printer capability notification unit (402) of the printing apparatus (101) notifies both IPP standard sheet types and vendor extension sheet types that are managed by the sheet DB (416) to the information processing apparatus (103, 104, 105) regardless of whether the information processing apparatus (103, 104, 105) supports displaying of vendor extensions. Further, in a case where an inquiry about a sheet type display method is received from the information processing apparatus (103, 104, 105), the printer capability notification unit (402) transmits an instruction as part of capability information, which causes the information processing apparatus (103, 104, 105) supporting displaying of vendor extension sheet types to display only vendor extension sheet types. Specifically, according to the first exemplary embodiment, in a case where the information processing apparatus (103, 104, 105) supports displaying of vendor extensions, sheet types to be transmitted are limited. According to the second exemplary embodiment, on the contrary, sheet types to be transmitted are not limited, and all sheet types are transmitted with an instruction indicating a request that only vendor extension sheet types among the transmitted sheet types are displayed.

FIGS. 8A and 8B will be described below.

First, a procedure in the information processing apparatus (103, 104, 105) will be described below.

FIG. 8A is a flowchart of an information processing apparatus according to a second exemplary embodiment. A flow of acquiring sheet types of the information processing apparatus (103, 104, 105) that supports both IPP standard sheet types and vendor extension sheet types will be described below. In step (S8101), the sheet selection display unit (511) of the information processing apparatus (103, 104, 105) requests a sheet type display mode supported by the printing apparatus (101) from the printing apparatus (101). In step (S8102), in a case where a sheet type display mode is acquired, the processing proceeds to step (S8103). On the other hand, in a case where no display mode is acquired, the processing proceeds to step (S8106). In step (S8106), both IPP standard sheet types and vendor extension sheet types are included in the selection list. In step (S8103), an operation is changed based on the acquired sheet type display mode.

In a case where the designated display mode is a mode of displaying IPP standard sheet types only, the processing proceeds to step (S8104), and IPP standard sheets are included in the sheet type selection list. In a case where the designated display mode is a mode of displaying vendor extension sheet types only, the processing proceeds to step (S8105), and only vendor extension sheets are included in the sheet type selection list. In a case where the designated display mode is a mode of displaying both IPP standard sheet types and vendor extension sheet types, the processing proceeds to step (S8106), and both IPP standard sheet types and vendor extension sheet types are included in the selection list.

Next, a procedure in the printing apparatus (101) side will be described below.

FIG. 8B is a flowchart of a printing apparatus according to the second exemplary embodiment. The printing apparatus (101) supports both IPP standard sheet types and vendor extension sheet types. Two procedures of processing by the printer capability notification unit (402) when capability notification information is notified to the information processing apparatus (103, 104, 105) will be described below. In step (S8201), the printing apparatus (101) having the first procedure of processing determines whether an inquiry about a sheet type display mode is received from the client. In a case where an inquiry is received, the processing proceeds to step (S8202). In step (S8202), the printing apparatus (101) notifies a sheet type display mode to the information processing apparatus (103, 104, 105). On the other hand, in a case where no inquiry is received, the processing proceeds to step (S8203). In step (S8203), both vendor extension sheet types and IPP standard sheet types are notified as sheet types that the printing apparatus (101) supports. In step (S8301), the printing apparatus (101) having the second procedure of processing determines whether an inquiry about a sheet type display mode is received from the client. In a case where an inquiry is received, the processing proceeds to step (S8302), and a sheet type display mode is notified. In a case where no inquiry is received, the processing proceeds to step (S8304). In step (S8303), both vendor extension sheet types and IPP standard sheet types are notified as sheet types that the printing apparatus (101) supports. In step (S8304), only IPP standard sheet types are notified as sheet types that the printing apparatus (101) supports.

Figure 10:
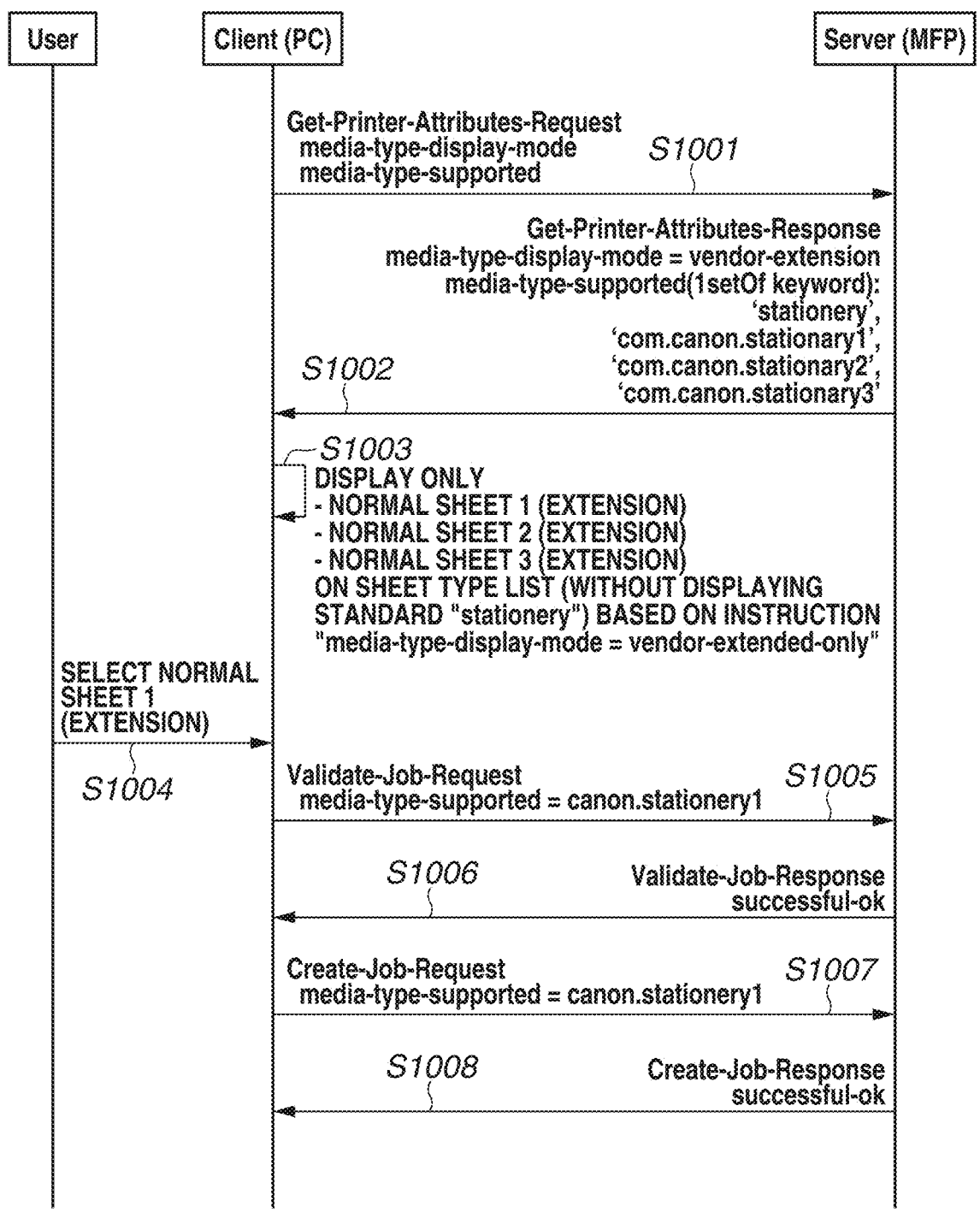
FIG. 10 is a diagram illustrating a sequence of the information processing apparatus and the printing apparatus according to the second exemplary embodiment.

FIG. 10 will be described below.

FIG. 10 illustrates a sequence of acquiring, from the printer, vendor extension sheet types and IPP standard sheet types from the printing apparatus (101) and acquiring a method for displaying sheet types on the print setting screen, by the information processing apparatus (103, 104, 105).

In step (S1001), the information processing apparatus (103, 104, 105) requests supported capability information from the printing apparatus (101). Specifically, an inquiry about supported sheet types is transmitted to the printing apparatus (101). In step (S1002), the IPP-Server of the printing apparatus (101) transmits a notification of selectable sheet type list information to the IPP-Client of the information processing apparatus (103, 104, 105). Furthermore, an instruction on displaying of sheet types is set to the media-type-display-mode attribute, and the set instruction is notified. The following three value ranges are settable to the media-type-display-mode attribute:

standard: an instruction to display IPP standard sheet types only, vendor-extension: an instruction to display vendor extension sheet types only, and standard-and-vendor-extension: an instruction to display IPP standard sheet types and vendor extension sheet types only.

In step (S1002), in a case where the IPP-Client of the information processing apparatus (103, 104, 105) supports vendor extension sheet types, "vendor-extension" is notified as a display mode. Thus, in a case where there is no notification and it is undeterminable whether the printing apparatus (101) supports vendor extensions, "standard-and-vendor-extension" or "standard" is notified as a display mode. Thus, as described above, in step (S1003), in a case where the display mode "standard" is notified, a list of only IPP standard sheet types is notified. For other display modes. such as "vendor-extension" and "standard-and-vendor-extension", both IPP standard sheet types and vendor extension sheet types are notified as a sheet list.

In step (S1004), the IPP-Client of the information processing apparatus (103, 104, 105) displays the notified sheet types on the print screen. The IPP-Client that supports instructions based on the media-type-display-mode attribute displays a sheet attribute list as specified in the attribute. The IPP-Client that does not support the media-type-display-mode attribute directly displays the sheet type list notified from the printing apparatus (101). In step (S1005), the user selects a sheet type from the print screen of the information processing apparatus (103, 104, 105) and presses a print button. Then, in steps (S1006) to (S1009), the sheet type selected by the user is added to a print ticket, and a print settings validation request (Validate-Job) and a job are transmitted (Print-Job).

FIGS. 12A and 12B will be described below.

FIGS. 12A and 12B illustrate samples of IPP communication messages according to the second exemplary embodiment. A message (1210) is a request for capability information from the information processing apparatus (103, 104, 105) to the printing apparatus (101), and a message (1220) is a response to the message (1210) from the printing apparatus (101) to the information processing apparatus (103, 104, 105). A method for acquiring a list of supported sheet types from the printing apparatus (101) by the information processing apparatus (103, 104, 105) is a request (1213) and a response (1221) of the media-supported attribute, and a list of IPP standard sheet sizes is notified. A method for acquiring a list of supported sheet types from the printing apparatus (101) by the information processing apparatus (103, 104, 105) is a request (1214) and a response (1222) of the media-type-supported attribute, and both vendor extension sheet types and IPP standard sheet types are notified. According to the second exemplary embodiment, the media-type-display-mode attribute is defined as a method for selectively switching between displaying of IPP standard sheet types and displaying of vendor extension sheet types by the information processing apparatus (103, 104, 105). The printing apparatus (101) issues the following instruction via a media-type-display-mode attribute (1215) requested from the information processing apparatus (103, 104, 105) and a response (1225) to the request. Specifically, an instruction to display both vendor extension sheet types and IPP standard sheet types or to display vendor extension sheet types only or IPP standard sheet types only on the print setting screen of the information processing apparatus (103, 104, 105) is issued. An example of a response (1225) in FIG. 12B is an instruction to display vendor extension sheet types only. A method for acquiring a message/catalog display language from the printing apparatus (101) by the information processing apparatus (103, 104, 105) is a request (1216) and a response (12261226) of the printer-strings-languages-supported attribute, and the information processing apparatus (103, 104, 105) acquires character strings for displaying vendor extension sheet types by acquiring a message/catalog of the language notified in this processing.

As described above, the IPP-Server control unit (401) and the printer capability notification unit (402) of the printing apparatus (101) notify sheet type display mode information to the information processing apparatus (103, 104, 105) in addition to sheet type information containing vendor extension sheet types. Thus, the information processing apparatus (103, 104, 105) supporting displaying of vendor extension sheet types and display mode designation can provide a designation method including a list of only vendor extension sheet types, in a case of a combination with the printing apparatus (101) that transmits a capability notification of all sheet types as vendor extension sheet types. This realizes a uniform display of sheet types on the printing apparatus (101) and on the information processing apparatus (103, 104, 105) and, furthermore, is a solution to a duplicate display of sheet types, whereby user operability improves.

The present invention is not limited to the above-described exemplary embodiments, and various changes and modifications can be made without departing from the spirit and scope of the present invention. The following claims are attached to disclose the scope of the present invention publicly.

Other Embodiments

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A printing apparatus comprising:
an interface configured to receive information for enabling the printing apparatus to recognize a display capability for displaying a sheet type by an information processing apparatus; and
a controller configured to determine, based on the received information, whether the information processing apparatus has a display capability for displaying vendor extension sheet type information,
wherein the interface is further configured to transmit, in a case where the controller determines that the information processing apparatus has the display capability, the vendor extension sheet type information to the information processing apparatus without transmitting Internet Printing Protocol (IPP) standard attribute sheet type information and to transmit, in a case where the controller determines that the information processing apparatus does not have the display capability, the IPP standard attribute sheet type information and the vendor extension sheet type information to the information processing apparatus.

2. A method for controlling a printing apparatus, the method comprising:
  receiving information for enabling the printing apparatus to recognize a display capability for displaying a sheet type by an information processing apparatus;
  determining, based on the received information, whether the information processing apparatus has a display capability for displaying vendor extension sheet type information; and
  transmitting, in a case where it is determined that the information processing apparatus has the display capability, the vendor extension sheet type information to the information processing apparatus without transmitting Internet Printing Protocol (IPP) standard attribute sheet type information and transmitting, in a case where it is determined that the information processing apparatus does not have the display capability, the IPP standard attribute sheet type information and the vendor extension sheet type information to the information processing apparatus.

3. A non-transitory computer-readable storage medium storing a program to cause a computer to perform a method for controlling a printing apparatus, the method comprising:
  receiving information for enabling the printing apparatus to recognize a display capability for displaying a sheet type by an information processing apparatus;
  determining, based on the received information, whether the information processing apparatus has a display capability for displaying vendor extension sheet type information; and
  transmitting, in a case where it is determined that the information processing apparatus has the display capability, the vendor extension sheet type information to the information processing apparatus without transmitting Internet Printing Protocol (IPP) standard attribute sheet type information and transmitting, in a case where it is determined that the information processing apparatus does not have the display capability, the IPP standard attribute sheet type information and the vendor extension sheet type information to the information processing apparatus.

* * * * *